United States Patent
Williams

(10) Patent No.: US 7,075,520 B2
(45) Date of Patent: Jul. 11, 2006

(54) KEY PRESS DISAMBIGUATION USING A KEYPAD OF MULTIDIRECTIONAL KEYS

(75) Inventor: Roland E. Williams, Pleasant Hill, CA (US)

(73) Assignee: Zi Technology Corporation LTD, Hamilton (BM)

(*) Notice: Subject to any disclaimer, the term of this patent is extended or adjusted under 35 U.S.C. 154(b) by 531 days.

(21) Appl. No.: 10/020,572

(22) Filed: Dec. 12, 2001

(65) Prior Publication Data
US 2003/0107555 A1   Jun. 12, 2003

(51) Int. Cl.
G09G 5/00 (2006.01)
(52) U.S. Cl. .......................... 345/169; 341/22
(58) Field of Classification Search ............ 345/168, 345/169, 172, 173; 341/22, 23
See application file for complete search history.

(56) References Cited

U.S. PATENT DOCUMENTS

| | | | |
|---|---|---|---|
| 3,978,508 A | 8/1976 | Vilkomerson | 357/26 |
| 4,029,915 A * | 6/1977 | Ojima | 708/145 |
| 4,055,735 A * | 10/1977 | Eachus et al. | 200/5 A |
| 4,244,000 A | 1/1981 | Ueda et al. | 357/39 |
| 4,268,815 A | 5/1981 | Eventoff et al. | 338/69 |
| 4,276,538 A | 6/1981 | Eventoff et al. | 338/69 |
| 4,337,665 A | 7/1982 | Sato et al. | 76/766 |
| 4,965,415 A | 10/1990 | Young et al. | 200/83 |
| 5,087,910 A * | 2/1992 | Guyot-Sionnest | 345/169 |
| 5,387,803 A | 2/1995 | Kurtz et al. | 257/3 |
| 5,455,203 A | 10/1995 | Koseki et al. | 437/228 |
| 5,528,235 A * | 6/1996 | Lin et al. | 341/22 |
| 5,569,626 A | 10/1996 | Kurtz et al. | 437/228 |
| 5,802,911 A | 9/1998 | Cahill et al. | 73/727 |
| 5,852,414 A * | 12/1998 | Yu et al. | 341/22 |
| 5,861,823 A * | 1/1999 | Strauch et al. | 341/22 |
| 5,994,655 A | 11/1999 | Tsai | 200/344 |
| 6,011,554 A * | 1/2000 | King et al. | 345/168 |
| 6,040,541 A | 3/2000 | Li | 200/344 |
| 6,064,020 A | 5/2000 | Yamada et al. | 200/344 |
| 6,068,416 A | 5/2000 | Kumamoto et al. | 400/491 |
| 6,072,134 A | 6/2000 | Sato et al. | 200/344 |
| 6,080,941 A | 6/2000 | Yokobori | 200/6 A |
| 6,107,584 A | 8/2000 | Yoneyama | 200/344 |
| 6,118,092 A | 9/2000 | Hayashi | 200/344 |
| 6,133,536 A | 10/2000 | Hunag et al. | 200/5 A |
| 6,133,539 A | 10/2000 | Yao | 200/517 |
| 6,140,595 A | 10/2000 | Yao | 200/344 |
| 6,153,843 A | 11/2000 | Date et al. | 200/339 |
| 6,156,986 A | 12/2000 | Tsai | 200/345 |
| 6,168,330 B1 | 1/2001 | Okada et al. | 400/472 |
| 6,180,048 B1 | 1/2001 | Katori | 264/400 |
| 6,180,900 B1 | 1/2001 | Horiuchi | 200/262 |
| 6,196,738 B1 | 3/2001 | Shimizu et al. | 400/490 |
| 6,257,782 B1 | 7/2001 | Maruyama et al. | 400/495.1 |
| 6,259,049 B1 | 7/2001 | Nakai | 200/341 |
| 6,265,677 B1 | 7/2001 | Chao | 200/5 A |
| 6,268,578 B1 | 7/2001 | Nakai | 200/520 |
| 6,271,835 B1 * | 8/2001 | Hoeksma | 345/168 |
| 6,597,345 B1 * | 7/2003 | Hirshberg | 345/168 |

* cited by examiner

Primary Examiner—Regina Liang
(74) Attorney, Agent, or Firm—James D. Ivey; Ivey, Smith and Ramirez

(57) ABSTRACT

Multidirectional keys of a reduced keypad are used to disambiguate between multiple symbols associated with a single key. For example, pressing a key identifies a collection of two or more symbols associated with the key and subsequently rocking the key selects one of the two or more symbols as unambiguously identified by the user.

21 Claims, 9 Drawing Sheets

| | | | | | | |
|---|---|---|---|---|---|---|
| パ° | パ゛ | ハ | ぽ | ぼ | ほ | へ |
| ペ | ベ | ヘ | ペ | ベ | ヘ | 9 |
| プ | ブ | フ | ぷ | ぶ | ふ 820 | o |
| ピ° | ビ | ヒ | ぴ | び | ひ | n |
| パ° | パ゛ | ハ | ぽ | ぼ | ほ | m |

812 — KATAKANA 10
810 — KATAKANA 2 DOTS
808 — KATAKANA
806 — HIRAGAMI: 10
804 — HIRAGAMI: 2 DOTS
802 — HIRAGAMI
814 — ROMANJI/NUMERAL SYMBOL/EMOTICA

"6" KEY IN JP

KEY PRESS DISAMBIGUATION USING A KEYPAD OF MULTIDIRECTIONAL KEYS

FIELD OF THE INVENTION

This invention relates to the field of user interface devices and methods and, in particular, to data entry using reduced keypads.

BACKGROUND OF THE INVENTION

The dramatic increase of popularity of the Internet has led to a corresponding dramatic rise in the popularity of textual communications such as e-mail and instant messaging. Increasingly, browsing of the World Wide Web of the Internet and textual communications are being performing using reduced keypads such as those found on mobile telephones.

Use of such reduced keypads for entering text in the Roman alphabet is manageable since there are only 26 letters in the Roman alphabet. Accordingly, generally three (3) or four (4) letters are mapped to each of eight (8) numerical keys as can be seen printed on numeric keypads on the vast majority of telephones sold in the United States. By having so few letters associated with each key, multi-tap systems provide useable but less than convenient text entry functionality for users of the Roman alphabet. Briefly, multi-tap systems determine a number of repeated presses of a key to disambiguate multiple letters associated with a single key. For example, pressing the "2" key once represents the letter "a"; pressing the "2" key twice represents the letter "b"; pressing the "2" key thrice represents the letter "c"; and pressing the "2" key four (4) times represents the numeral "2". The number of presses of a particular key is typically delimited with a brief pause.

While feasible, entering textual data of the Roman alphabet using multi-tap is cumbersome and time-consuming. However, text entry for other written languages which include many more symbols is even more difficult. In particular, Chinese is written using as many as 10,000 distinct characters, Japanese is written using 7,100 or more distinct characters, and Korean is written using roughly 11,000 distinct characters. Mapping so many distinct characters to ten (10) numeric keys of a telephone keypad would require approximately 70 to 110 distinct characters per key. Accordingly, multi-tap is not feasible to disambiguate among so many distinct characters mapped to a single keypad key.

Japanese and Korean written languages mitigate this problem to some degree as written Japanese can be accomplished using approximately seventy-five (75) distinct symbols associated with the Japanese "fifty-sounds table" and written Korean symbols (called hanguls) are composed using approximately forty (40) sub-symbols (called jamos). Even so, mapping 40–50 distinct written symbols to the ten (10) numeric keys of a standard telephone keypad makes multi-tap approximately twice as complex and inconvenient as multi-tap is for the Roman alphabet.

Some attempts have been made to use predictive interpretation of key presses to disambiguate multiple written symbols associated with various keys. Such predictive interpretation is described by Zi Corporation at http://www.zicorp.com on the World Wide Web and in U.S. Pat. No. 5,109,352 to Robert B. O'Dell (hereinafter the O'Dell Patent). Predictive interpretation is generally effective and greatly simplifies text input using reduced keypads and very large collections of written symbols. However, predictive interpretation has difficulty with words used in proper nouns, slang, and neology as such words might not be represented in a predictive database.

What is needed is an improved mechanism for disambiguating among multiple symbols associated with individual keys of a reduced keypad.

SUMMARY OF THE INVENTION

In accordance with the present invention, multidirectional keys of a reduced keypad are used to disambiguate between multiple symbols associated with a single key. For example, pressing a key identifies a collection of two or more symbols associated with the key and subsequently rocking the key selects one of the two or more symbols as unambiguously identified by the user.

Each key of the reduced keypad is multidirectional in that the key can be actuated in a number of distinct ways. For example, the key can be pressed (i.e., pushed generally straight down) or rocked in any of a number of directions while pressed. A particularly convenient arrangement for users is to recognize rocking of the key in an upward direction, a downward direction, a left direction, and a right direction. Such directions are generally easily understood and utilized by most users.

A character map associated with a multidirectional key assists in understanding and appreciating navigation among the two or more symbols associated with a key. Such is more readily appreciated in the context of an illustrative example. Consider the "8" key of a standard numeric keypad of a standard telephone which represents an association with the letters "t," "u," and "v," in that order. Pressing the "8" key initially specifies the center letter, namely, the letter "u." Rocking the "8" key to the left while still pressed changes the specified letter to the letter "t" much like a shift in attention from the center to the left, i.e., in the direction the "8" key is rocked. Rocking the "8" key to the right subsequently changes the specified letter back to the letter "u" in a move of attention to the right of the letter "t." Rocking the "8" key in an upward direction changes the case of the specified letter from lower-case to upper-case.

Thus, the user can easily and intuitively navigate a character map associated with a single key. As demonstrated in the above illustrative example, the user can not only select a letter from a collection of multiple letters but can also readily specify upper- or lower-case for that letter with a single key. This is not currently done using any disambiguation technique and represents a significant advance in the art. It should also be noted that the upward direction of rocking to indicate an upper-case character is intuitive since upper-case represents a higher degree of significance. Thus, an upward rocking moves the degree of significance in an upward direction. Conversely, rocking the same key downward moves the degree of significance in a downward direction, e.g., from upper-case back to lower-case.

Similarly, international variants of characters associated with a key can be included in the character map of the key. Continuing in the illustrative example of characters associated with the "8" key of a numeric keypad, the letter "u" has—in addition to lower- and upper-case variants—international variants which include, for example, "ü," "Ü," "ú," "Ú," "ù," "Ù,""û,"and "Û." These international variants are included in the character map for the "8" key of the numeric keypad such that the user can readily specify any international variant of the letter "u"—in either lower- or upper-case—without ambiguity. International variants of other letters are similarly included in character maps associated with other keys.

In addition, numerals and symbols can readily be incorporated in the character map of a single key, providing significant flexibility and functionality. The up, down, left, and right directions of key rocking enable use of two-directional character maps associated with each key. Such a two-dimensional mapping allows a significant number of characters to be reachable with relatively few user interface gestures. Thus, the character map for the "8" key of a numeric keypad could include the numeral "8" itself and typographic and other symbols as well.

Furthermore, quite large numbers of symbols can be associated with a single key, e.g., nearly forty (40) symbols associated with a single consonant group in the Japanese language, and can be easily navigated by a user so long as the organization is one that the user can readily understand and follow.

In addition to written symbols, some text input systems use keys to represent one or more strokes by which the text can be manually written. One example of such a system is described in the O'Dell Patent. A user can unambiguously specify a stroke among a group of multiple strokes associated with a single key by pressing the key to identify the group and rocking the key in the manner described herein. The orientation of the individual strokes of the group with respect to one another in the character map associated with the key is such that the rocking motion used by the user to identify individual strokes is natural and intuitive. For example, higher strokes are specified by rocking the key in the up direction. Similarly, lower strokes are specified by rocking the key in the down direction.

BRIEF DESCRIPTION OF THE DRAWINGS

FIG. 8 is a character map illustrating spatial relationships between multiple Japanese language symbols associated with a single key in accordance with the present invention.

DETAILED DESCRIPTION

In accordance with the present invention, multidirectional keys are used in a reduced keypad 110 (FIG. 1) to disambiguate among several symbols associated with each key. Such allows a small keypad or keyboard to accurately and efficiently represent more symbols than there are keys.

Figure 1:
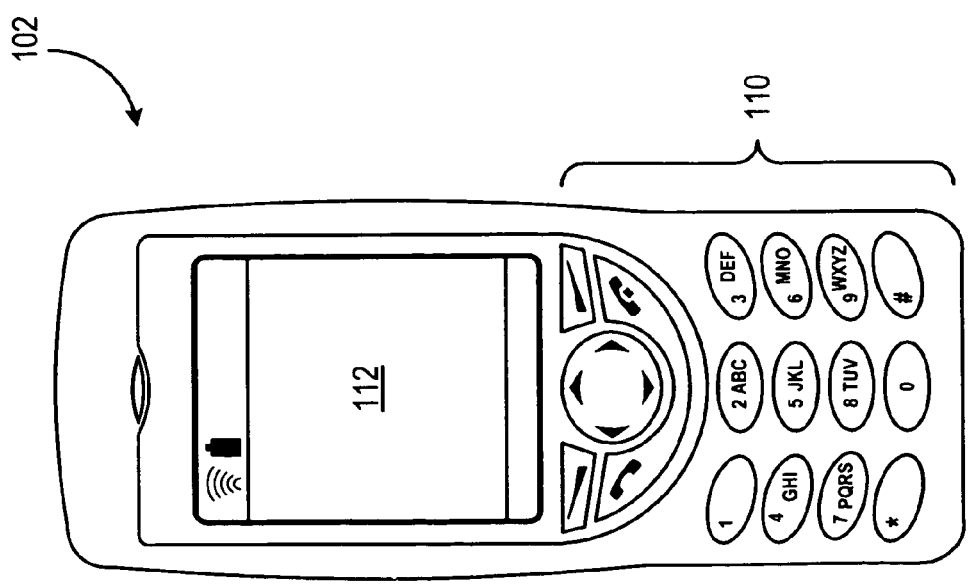
FIG. 1 is a diagrammatic view of a mobile telephone which includes a keypad of multidirectional keys in accordance with the present invention.

In this illustrative embodiment, keypad 110 is a numeric keypad from a mobile telephone 102. Keys 202 (FIG. 2) and 302 (FIG. 3) are multidirectional and are illustrative embodiments of the keys of keypad 110 (FIG. 1). Multidirectional keys are known and are described in U.S. Pat. No. 6,080,941 to Yokobori, for example. However, keys 202 (FIG. 2) and 302 (FIG. 3) are described herein for completeness and to facilitate understanding and appreciation of the present invention.

Key 202 (FIG. 2) includes a center protrusion 208; lateral protrusions 210U, 210D, 210L, and 210R; and corner bumpers 212A–D. Center protrusion 208 is positioned over a center pressure switch which includes a fixed electrode 206C and a contact switch electrode 204C (which are sometimes referred to herein as switch 204C/206C) such that pressing key 202 generally straight down presses center protrusion 208 against the center pressure switch to place contact switch electrode 204C and fixed electrode 206C.

Each of lateral protrusions 210U, 210D, 210L, and 210R is positioned over a corresponding lateral pressure switch. These lateral pressure switches include the following respective pairs of electrodes: (i) fixed electrode 206U and contact switch electrode 204U, (ii) fixed electrode 206D and contact switch electrode 204D, (iii) fixed electrode 206L and contact switch electrode 204L, and (iv) fixed electrode 206R and contact switch electrode 204R (which are sometimes referred to herein as lateral switches 204U/206U, 204D/206D, 204L/206L, and 204R/206R, respectively).

Figure 4:
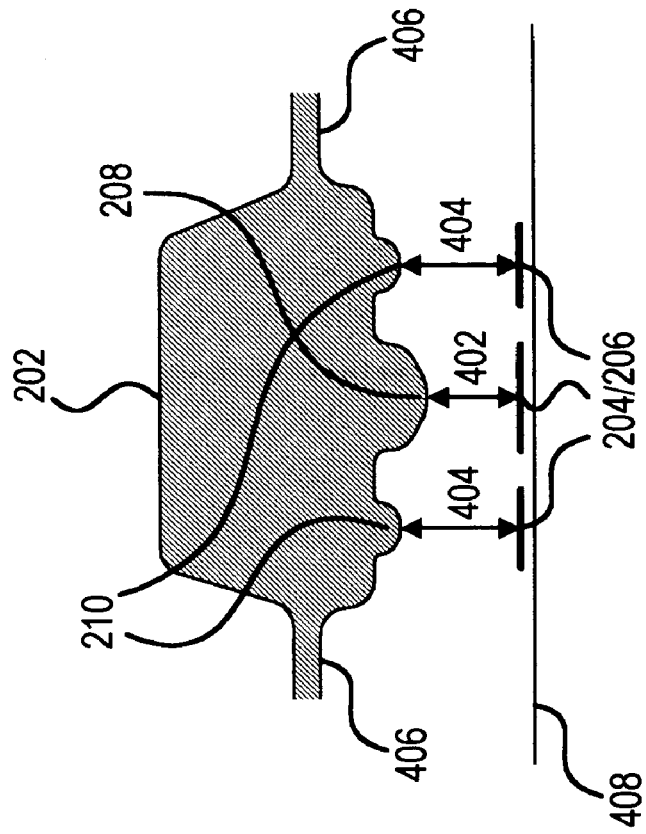
FIG. 4 is a cross sectional view of the multidirectional key of FIG. 2.

Center protrusion 208 is taller than lateral protrusions 210U, 210D, 210L, and 210R, and corner bumpers 212A–D such that pressing key 202 generally contacts the center pressure switch first, i.e., before any other pressure switches are closed. In particular, switch 202 is held above a substrate 408 (FIG. 4) on which are formed switches 204/206 (i.e., center switch 204C/206C and lateral switches 204U/206U, 204D/206D, 204L/206L, and 204R/206R collectively) by a rubber membrane 406. Center protrusion 208 rests at a distance 402 from center switch 204C/206C, and lateral protrusions 210 rest a distance 404 from lateral switches 204/206. Membrane 406 tends to hold key 202 in an untilted orientation and distance 404 is greater than distance 402 such that pressing key 202 generally straight down closes center switch 204C/206C and leaves lateral switches 204U/206U, 204D/206D, 204L/206L, and 204R/206R open. Membrane 406 also serves as a spring to return key 202 to its native position after being released.

Lateral pressure on key 202, e.g., tilting key 202 to the left, rocks key 202 about center protrusion 208 such that lateral protrusion 210L presses upon and closes lateral switch 204L/206L while center switch 204C/206C is held closed. Corner bumpers 212A–D (FIG. 2) prevent more than one of lateral protrusions 210U, 210D, 210L, and 210R contacting substrate 408—and therefore closing of more than one of lateral switches 204U/206U, 204D/206D, 204L/206L, and 204R/206R—at one time. In an alternative embodiment, corner bumpers 212A–D are omitted and closing of two lateral switches simultaneously indicate tilting of key 202 in a diagonal direction such as up/left, up/right, down/left, or down/right. In still another embodiment, lateral switches differ from four (4) in number and/or are arranged in orientations other than those shown, namely, other than up/down and left/right.

Thus, key 202 and switches 204/206 enable both (i) detection of pressing of key 202 and (ii) detection of rocking of key 202 in the direction of any of lateral switches 204U/206U, 204D/206D, 204L/206L, and 204R/206R.

Figure 3:
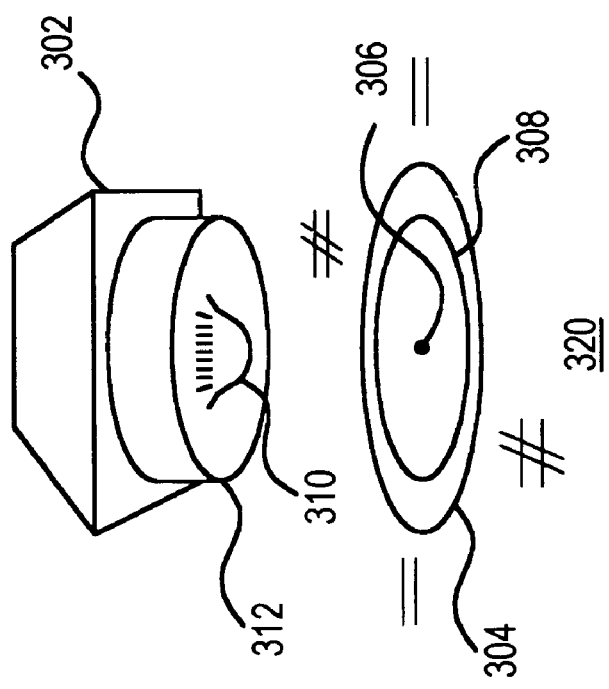
FIG. 3 is a perspective view of an alternative multidirectional key used in accordance with the present invention.

FIG. 3 shows an alternative multidirectional key 302 positioned over a pressure-sensitive area 320. Key 302 has a center protrusion 310 and an annular protrusion 312. Center protrusion 310 is positioned over a central position 306 within pressure-sensitive area 320 and held in place there by a membrane similar to membrane 420 (FIG. 4) described above. Similarly, annular protrusion 312 is positioned over an annular area 308 of pressure-sensitive area 320. Center protrusion 310 protrudes further from key 302 than does annular protrusion 312 such that pressing key 302 generally straight down applies sensible pressure to center area 306 without applying sensible pressure to annular area 308. Rocking key 302 in any lateral direction causes annular protrusion 312 to reach pressure-sensitive area 320 and to apply sensible pressure to annular area 308. Thus, key 302 and pressure-sensitive area 320 enable both (i) detection of pressing of key 302 and (ii) rocking of key 302 in any direction.

In an alternative embodiment, annular track 308 is a resistive track and annular protrusion 312 applies a voltage to annular track 308. A position of contact between annular track 308 and annular protrusion 312 can be determined by determining the amount of resistance between such a contact point and a fixed terminal (not shown) on annular track 308.

In either embodiment corresponding to FIG. 3, mechanical stops can be placed near annular track 308 to limit places at which annular protrusion 312 can contact annular track 308, e.g., in only up, down, left, and right directions. Alternatively, such contact can be permitted in any direction and logic can be used to interpret such contact as being directed up, down, left, right, or any other direction such as diagonal for example.

In this illustrative embodiment, keypad 110 (FIG. 1) of mobile telephone 102 includes twelve (12) multidirectional keys such as keys 202 and 302 arranged in a grid orientation that is both standard and ubiquitous in telephones in use today. Keypad 110 has both a numeric mode and an alphanumeric mode as do keypads of any of a number of mobile telephones available today which support text messaging in addition to conventional voice telephony. The user of mobile telephone 102 switches between numeric and alphanumeric modes in a conventional and known manner.

Figure 5:
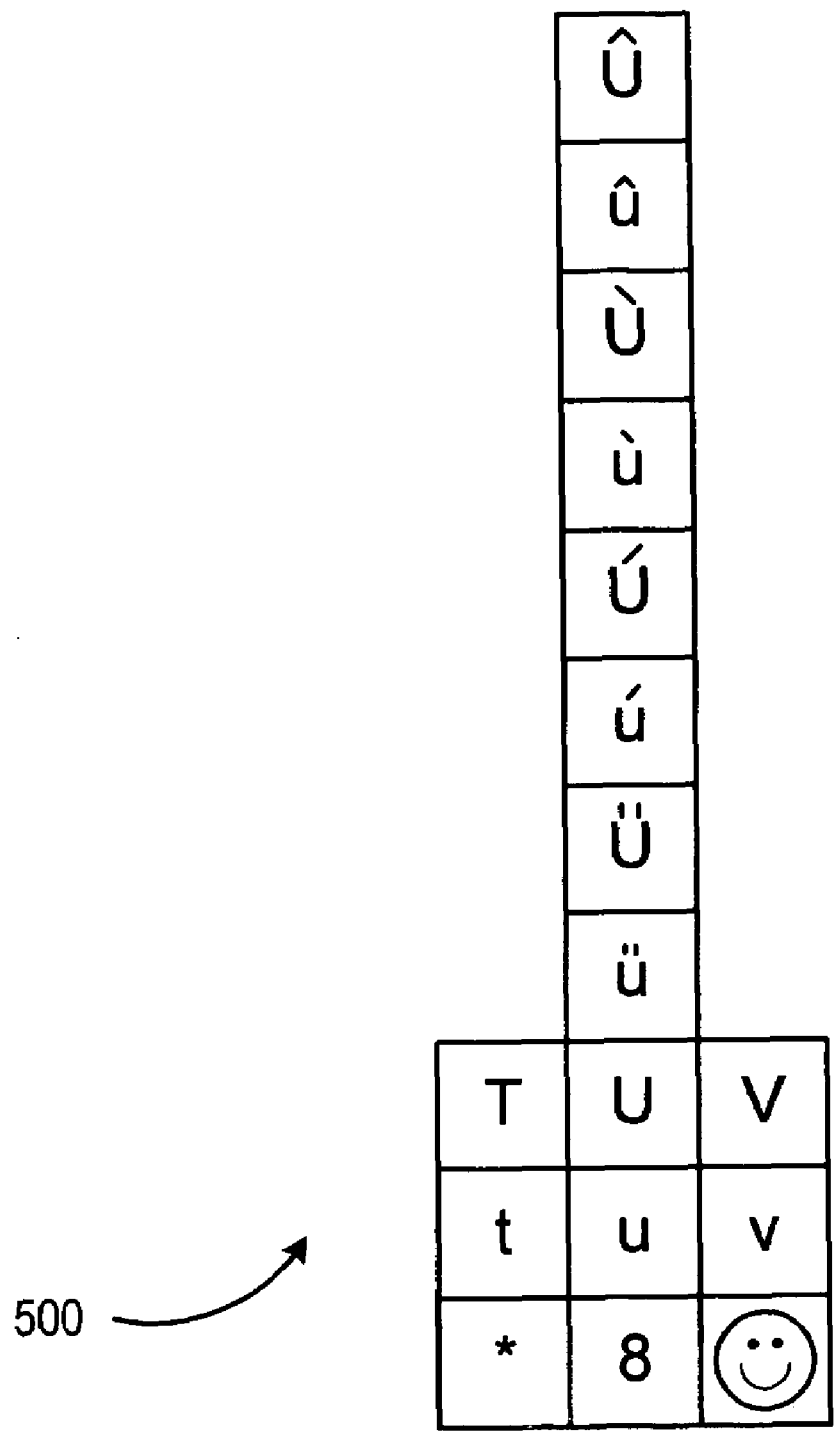
FIG. 5 is a character map illustrating spatial relationships between multiple symbols associated with a single key in accordance with the present invention.

In the numeric mode, the keys of keypad 110 correspond to the numbers associated with each key and to an asterisk and a pound sign as is known and conventional on currently available telephones. In the alphanumeric mode, each of the keys of keypad 110 has an associated character map. FIG. 5 shows a character map 500 for the "8" key of keypad 110 (FIG. 1). Briefly, and as explained in greater detail below, the user specifies the letter "u" by simply pressing the "8" key but specifies other characters of character map 500 by rocking the "8" key in the direction of those characters as represented in character map 500.

Figure 6:
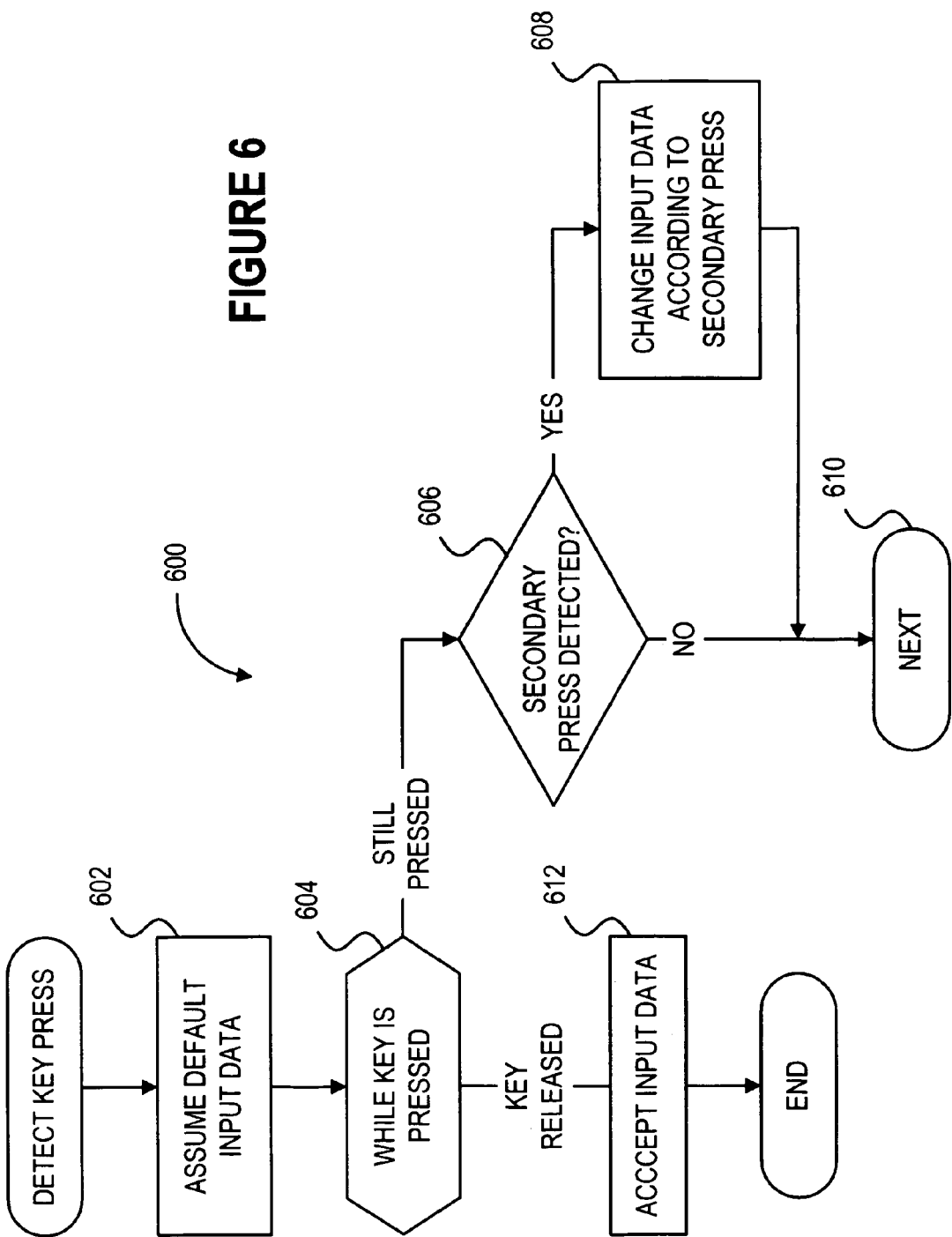
FIG. 6 is a logic flow diagram of the processing of multidirectional key manipulation by a user to specify one of a collection of symbols associated with a single key in accordance with the present invention.
Figure 11:
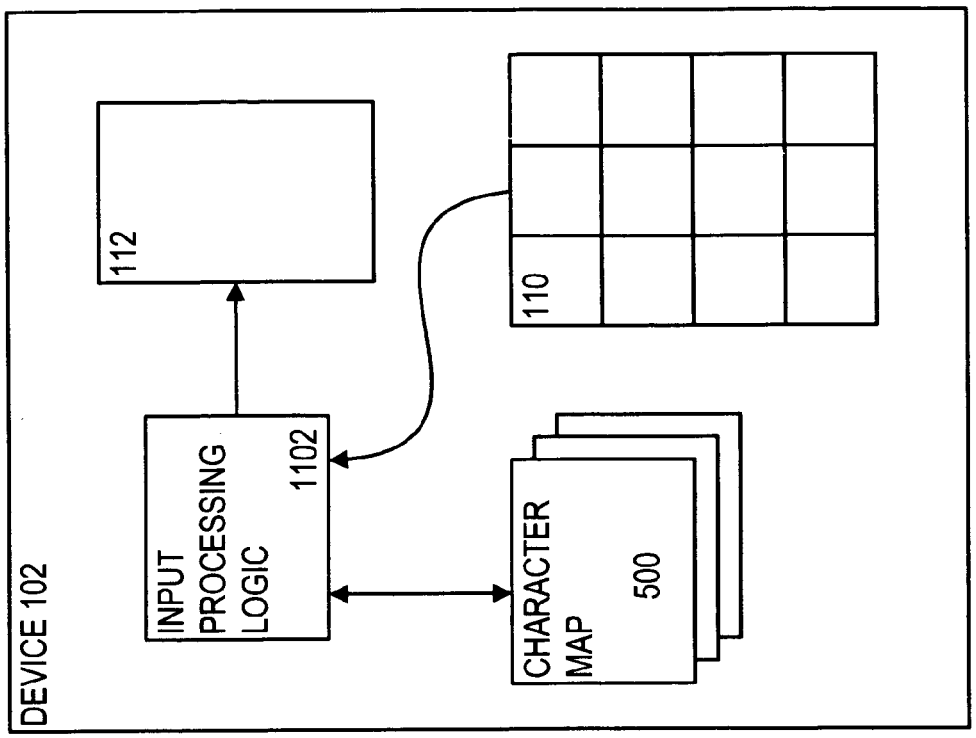
FIG. 11 is a block diagram of the mobile telephone of FIG. 1 in greater detail.

Processing of key presses in accordance with the alphanumeric mode is illustrated by logic flow diagram 600 (FIG. 6). The steps of logic flow diagram 600 are performed by input processing logic 1102 (FIG. 11) of device 102. Input processing logic 1102 can include circuitry and/or a combination of a processor and computer instructions and data. Input processing logic 1102 receives signals from keypad 110 and those signals identify which key of keypad 110 is pressed and in which direction the pressed key is rocked, if any. Input processing logic 1102 uses that information to interpret the particular symbol intended to be entered by the user.

Input processing 1102 also uses a number of character maps, generally one per key of keypad 110, including character map 500. In this illustrative embodiment, each character map includes a two-dimensional array of symbols represented by a corresponding key of keypad 110 and a vector indicating a default character within the character map. In step 602 (FIG. 6), input processing logic 1102 (FIG. 11) assumes the default input character according to the character map of the pressed key. In this illustrative example, the pressed key is the "8" key of keypad 110 and the associated character map is character map 500. In the context of character map 500 (FIG. 5), the default character is the lower-case letter "u."

Loop step 604 (FIG. 6) and next step 610 define a loop in which steps 606–608 are repeated so long as the subject key is pressed. In the context of this description of logic flow diagram 600, the user has pressed key 202 (FIG. 2) which is associated with character map 500 (FIG. 5). Thus, so long as the user holds key 202 pressed—i.e., so long as center switch 204C/206C is closed—the loop of steps 604–610 repeats.

In test step 606, input processing logic 1102 (FIG. 11) determines whether any of lateral switches 204/206 (FIG. 2) is closed. If any such lateral switch is closed, processing transfers to step 608 (FIG. 6). Otherwise, step 608 is skipped.

It should be appreciated that the loop of steps 604–610 can be processed much more quickly than a user can respond to carefully select a particular symbol of character map 500. Accordingly, one of two well-known and conventional techniques is used to slow the process to one in which the user can effectively navigate character map 500.

In the first technique, the closing of any of lateral switches 204/206 (i.e., the state transition from open to closed) is the event detected by input processing logic 1102 (FIG. 11) in test step 606 (FIG. 6) such that the user must rock switch 202 (to the left for example) and return switch 202 (FIG. 2) to a generally upright and pressed position before rocking switch 202 in the same or a different direction to further navigation character map 500 (FIG. 5). Input processing logic 1102 (FIG. 11) does not act upon holding of the closed lateral switch in a closed position and a transition to an open state of the closed lateral switch in this first technique.

The second technique incorporates the first technique and adds detection by input processing logic 1102 of holding of any lateral switch in the closed position for a predetermined period of time such that rocking switch 202 (to the left, for example). Input processing logic 1102 interprets holding of key 202 in this position beyond the predetermined period of time as two consecutive rockings of key 202.

Figure 2:
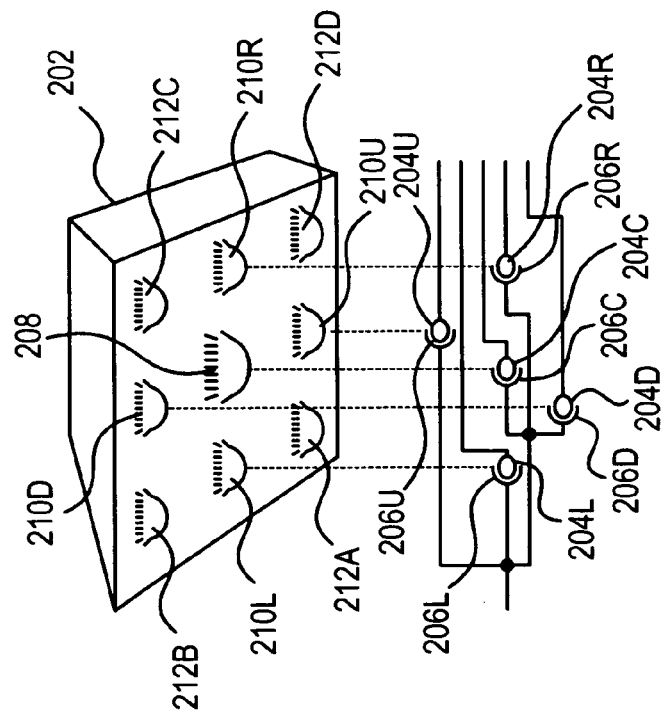
FIG. 2 is a perspective view of a multidirectional key used in accordance with the present invention.
Figure 7:
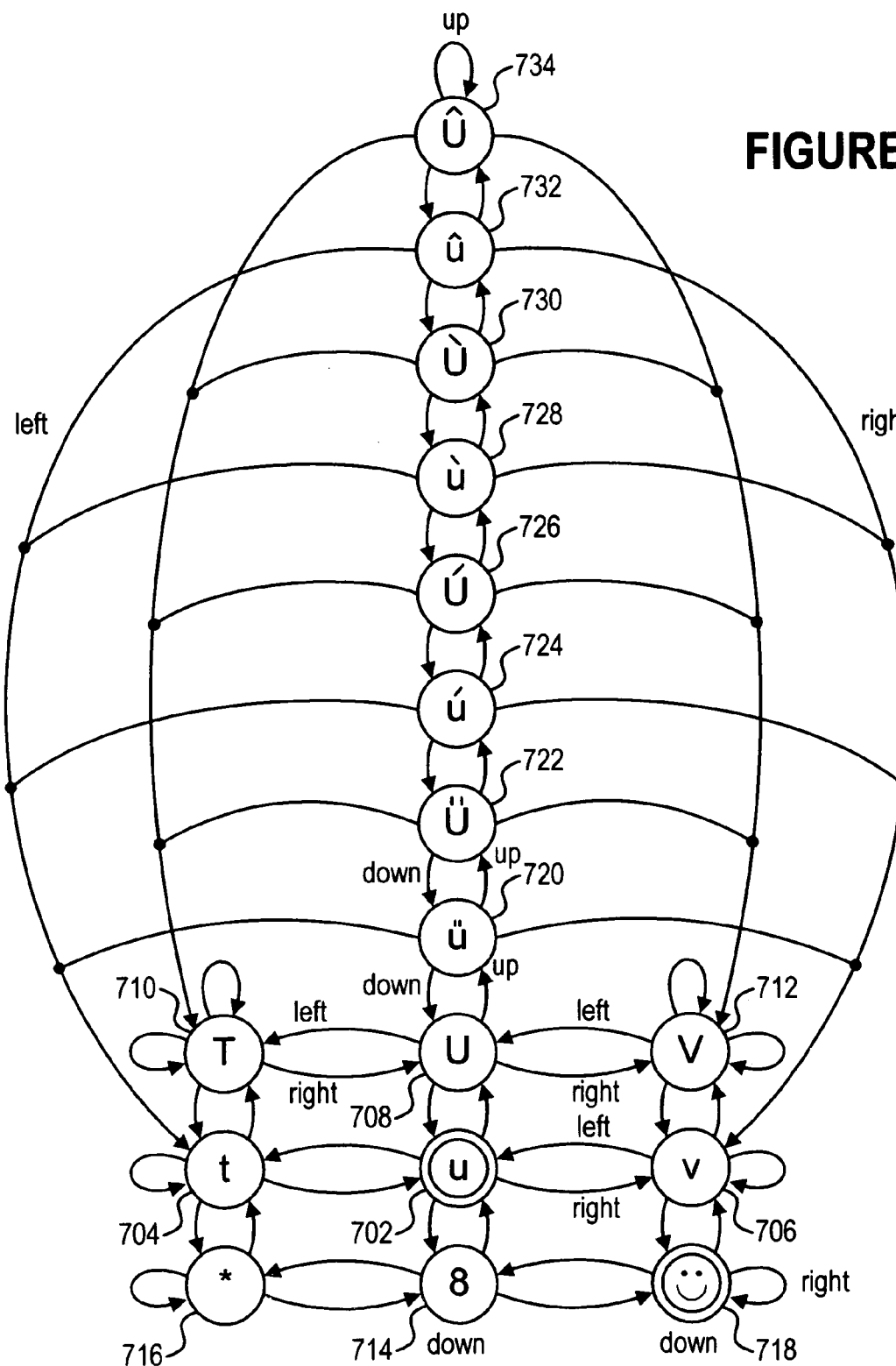
FIG. 7 is a state diagram illustrating navigation of the character map of FIG. 5 by the user in accordance with the present invention.

In step 608 (FIG. 6), input processing logic 1102 changes the input character assumed thus far in accordance with the detected lateral actuation of key 202. State diagram 700 (FIG. 7) illustrates changes in the assumed input character according to lateral actuations of key 202 (FIG. 2).

In state diagram 700 (FIG. 7), the default input character for the "8" key, e.g., key 202 in this illustrative example, is the lower-case letter "u" as shown in initial state 702. If the user rocks key 202 to the left, a state transition to state 704 is made and the assumed input character is a lower-case "t." Rocking key 202 to the right changes the assumed input character back to the lower-case letter "u" in a state transition back to state 702. From state 704, rocking key 202 to the left does not cause any change in state. In an alternative embodiment, rocking key 202 to the left from state 704 causes a transition to state 706 in which the assumed input character is the lower-case letter "v"—thus, in effect, any traversal of character map 500 (FIG. 5) exceeding a boundary wraps around to the opposite boundary in a known and conventional manner.

From state 702 (FIG. 7), rocking key 202 to the right causes a state transition to state 706. And, in the manner described above with respect to state 704, rocking key 202 to the right from state 706 does not cause a state transition or, in an alternative embodiment, causes a transition to state 704 in a wrap around fashion. It should be appreciated that states 702–706 represent the letters displayed on a "8" key of a standard and ubiquitous telephone keypad in both (i) alphabetic order and (ii) in the spatial orientation displayed on the "8" key. Accordingly, the rocking of the "8" key to choose the particular letter intended by the user is straight forward and intuitive.

Specification of upper-case letters by the user is equally straightforward and intuitive, unlike both multi-tap and predictive text entry systems. From any of states 702, 704, or 706, rocking key 202 in an up direction (e.g., toward the top end of mobile telephone 102—FIG. 1) causes a state transition to a corresponding upper-case state. In particular, state 702 (FIG. 7) representing a lower-case letter "u" transitions to state 708 representing an upper-case letter "U;" state 704 representing a lower-case letter "t" transitions to state 710 representing an upper-case letter "T;" and state 706 representing a lower-case letter "v" transition to state 712 representing an upper-case letter "V." State transitions among states 708–712 in response to left and right rockings of key 202 are directly analogous to state transitions among states 702–706 in response to left and right rockings of key 202 as described above. Rocking key 202 in the up direction while in either of states 710 and 712 does not cause a state transition as shown. In an alternative embodiment, rocking key 202 in the up direction while in either of states 710 and 712 causes a state transition to a corresponding one of states 714 and 718 in a wrap around fashion. Rocking key 202 in a down direction (e.g., toward the bottom end of mobile telephone 102—FIG. 1) while in any of states 708–712 causes a state transition to a corresponding one of lower-case states 702–706 as shown.

In addition to upper- and lower-case letters, the user can unambiguously specify letters from an international alphabet. For example, rocking key 202 in the up direction while in state 708 causes a transition to state 720 which represents the lower-case international letter "ü." Rocking key 202 in the up direction additional times causes transitions to states 722–734 in sequence, enabling the user to unambiguously specify the following respective international letters: "Ü," "ú," "Ú," "ù," "Ù," "û," and "Û." Thus, any of ten (10) variations of the letter "u" can be unambiguously specified by the user easily and intuitively.

From state 734, pressing key 202 in the up direction can result in remaining in state 734 or can cause a wrap around transition to state 714 in a manner analogous to that described with respect to state 710.

States 720, 724, 728, and 732 represent international variants of the lower-case letter "u." Accordingly, rocking key 202 while in any of states 720, 724, 728, and 732 in the left direction causes a transition to a lower-case letter in the subcategory to the left, namely, lower-case letter "t" represented by state 704. Similarly, rocking key 202 while in any of states 720, 724, 728, and 732 in the right direction causes a transition to a lower-case letter in the subcategory to the right, namely, lower-case letter "v" represented by state 706. Thus, with respect to left and right movement, international variations of the lower-case letter "u" behave in the same manner as lower-case letter "u" itself and therefore behave in a manner intuitive to, and readily grasped by, the user.

Upper-case international variations behave in the same manner. Specifically, rocking key 202 while in any of states 722, 726, 730, and 734 in the left direction causes a transition to a upper-case letter in the subcategory to the left, namely, upper-case letter "T" represented by state 710. Similarly, rocking key 202 while in any of states 722, 726, 730, and 734 in the right direction causes a transition to a upper-case letter in the subcategory to the right, namely, upper-case letter "V" represented by state 712.

Of course, textual communication involves characters other than letters. Textual communication involves numeral, typographical characters, and increasingly symbols of emotional state commonly referred to as emoticons. Accordingly, states 714, 716, and 718 represent the numeral "8," the typographical symbol "*," and a smiley face emoticon, respectively. From initial state 702, rocking key 202 in the down direction causes a state transition to state 714. Accordingly, the enter the numeral "8" in the alphanumeric mode according to the present invention, the user simply presses the "8" key and rocks the "8" key downward—just two gestures. By contrast, multi-tap systems typically require the user to press the "8" key four (4) times to identify the numeral "8" and a pause to accept the numeral "8" as the entered character. Other keys, e.g., the "7" and "9" keys, typically require an additional key press to identify corresponding numerals using multi-tap.

State 716 represents the typographical symbol "*" (i.e., the asterisk) since that symbol is associated with the "8" key on computer keyboards everywhere. Thus, an intuitive and straight forward gesture sequence unambiguously specifies the asterisk—namely, pressing the "8" key, e.g., key 202, rocking key 202 in the down direction to specify the numeral "8" and rocking key 202 to the left to indicate a shift-8 character, i.e., the asterisk.

Beyond traditional letters, numerals, and typographic symbols, additional symbols can be added to character map 500. For example, a smiley emoticon associated with state 718 is included in character map 500. It should be appreciated that other spatial relations and dimensions of character map 500, and therefore state diagram 700, can be implemented in accordance with the present invention. For example, additional typographical symbols and/or emoticons and/or other symbols can be associated with states reachable by further rocking key 202 in the down direction. Such enables rarely used symbols to be accessible using a very small keypad by simply rocking a key one or more additional times. Similarly, additional columns can be added to character map 500 (and correspondingly to state diagram 700) to represent additional letters using a single key. For example, the "7" key of the standard and ubiquitous telephone keypad is typically associated with four (4) letters, namely, "p," "q," "r," and "s."

It should be noted that organization of individual characters of character map 500 serve generally two purposes in this illustrative embodiment: namely, logical grouping and reduction of user interface gestures. As for logical grouping, variations of a single character are grouped into individual columns. Thus, if the user rocks key 202 in the up direction to transition from a lower-case "u" (state 702) to an upper-case "U" (state 708), the user intuitively repeats the same gesture to see more similar choices, specifically, international variants of "u" and "U."

Returning now to step 608 (FIG. 6) of logic flow diagram 600, the loop of steps 604–610 is repeated until the user releases the pressed key. Thus, release of the subject key is detected as selection of the currently assumed symbol. In effect, the user presses key 202, the default character (e.g., lower-case letter "u" as described above) is displayed in a position indicated by a cursor in a conventional and known manner. The user then rocks the subject key left, right, up, and/or down until the intended symbol is displayed in the position indicated by the cursor. The user makes the selection by releasing the subject key.

To facilitate navigation of a given character map, e.g., character map 500, the character map can be displayed in display 112 (FIGS. 1 and 11) and the currently assumed character can be highlighted to provide feedback to the user regarding which character is currently assumed and to provide graphical guidance as to what direction the pressed key should be rocked to indicate an intended character. The displayed character map is removed from display 112 when the key is released to select a character in this illustrative embodiment.

Using a keypad of multidirectional keys allows mapping of particularly large collections of symbols to a rather small keypad. One particularly illustrative example is provided by character map 800 (FIG. 8) which maps characters associated with the "6" key of a Japanese language telephone keypad. The Japanese written language is briefly described for completeness and to facilitate appreciation and understanding of the advantages provided by this illustrative embodiment of the present invention.

The Japanese written language includes many characters of Chinese origin called kanji wherein each kanji character represents a word. In addition, written Japanese includes two (2) sets of phonetic symbols, namely, hiragana and katakana, each of which represents the same set of fifty or so sounds. The organization of both hiragana and katakana is called a "fifty sounds table" and is well known to all fluent writers of the Japanese language. While the fifty-sounds table organizes symbols representing approximately fifty sounds, additional sounds can be represented by writing some of the symbols using one of two diacritical marks, namely, the two-dots mark and the one-circle mark. Accordingly, each of the two sets—hiragana and katakana—actually contains closer to seventy-five (75) unique characters.

All Japanese words can be written using either just hiragana or just katakana; however, the preferred style is to use kanji for certain parts of speech and hiragana or katakana for other parts of speech. Hiragana is preferred for words which are of Japanese origin, and katakana is preferred for words of foreign original. Conversion of all hiragana to a proper combination of kanji, hiragan, and katakana is conventional and well-known.

To exacerbate the complexity of written Japanese, romaji (letters from the Roman alphabet) can also be used for names of foreign companies and other foreign proper nouns, and arabic numerals such as those currently used in Western written languages can also be used.

The fifty-sounds table includes ten (10) consonant groups—including one group associated with a null consonant, i.e., no consonant at all—which maps nicely to the ten (10) numeric keys of a telephone keypad. However, the collection of ten (10) consonant groups excludes any use of either of the two (2) diacritical marks of the Japanese language. Character map 800 (FIG. 8) shows characters associated with the "6" key on a telephone keypad in a Japanese language alphanumeric mode.

Cell 820 represents the initial state when the "6" key is first pressed. Row 802 includes hiragana characters of the consonant group corresponding most closely to the English consonant "h." Rocking the "6" key left and/or right traverses row 802 to select a hiragana character of this consonant group. Since hiragana is used more frequently than katakana, assuming the kiragana symbol set simplifies usage for the native Japanese speaker.

Hiragana of this consonant group are found with either the two-dots diacritical mark (corresponding most closely to the English consonant "b" when combined with the "h" consonant) or the one-circle diacritical mark (corresponding most closely to the English consonant "p" when combined with the "h" consonant). Row 804 includes hiragana of this consonant group with the two-dots diacritical. The user accesses row 804 by rocking the "6" key up once. Row 806 includes hiragana of this consonant group with the one-circle diacritical. The user accesses row 806 by rocking the "6" key up once more. Thus, the user can unambiguously specify a symbol of this consonant group using either type of diacritical mark in a reduced keypad and, in particular, using a single key.

As described above, katakana is an alternative representation to the hiragana of the same sounds. Accordingly, rows 808, 810, and 812 are katakana equivalents of hiragana rows 802, 804, and 806, respectively. Since hiragana is used more frequently than katakana, rows representing hiragana is placed closer to initial cell 820 than rows representing katakana. Thus, the user can unambiguously specify any character of this consonant group with any combination diacritical mark and a selected symbol set from hiragana and katakana using a single key.

In addition, row 814 includes the romaji letters "m," "n," and "o;" the Arabic numeral "6;" and a typographical symbol associated with the numeral "6"—namely, "^." Upper-case letters, international variants of letters, other typographical symbols and emoticons, and other symbols likely to be used by a Japanese author of an alphanumeric string of text can be added in additional rows.

Character map 800 shows thirty-five (35) characters mapped to a single keypad key. In addition, each character of character map 800 can be unambiguously specified by the user using a single key in no more than seven (7) gestures. Mapping so many characters to a single key using the conventional multi-tap mechanism could require as many as thirty-five (35) sequential presses of the same key without pausing to unambiguously specify a character. Using single key presses aided by predictive analysis provides a very useful interface. However, so many characters associated with a single key significantly reduces the accuracy and benefits attained through such predictive analysis.

Characters can be similarly mapped for other languages according to any grouping; however, it is preferred that the character grouping be one that is familiar to writers of the particular language in question such that such users can quickly adapt to the character groupings.

Figure 9:
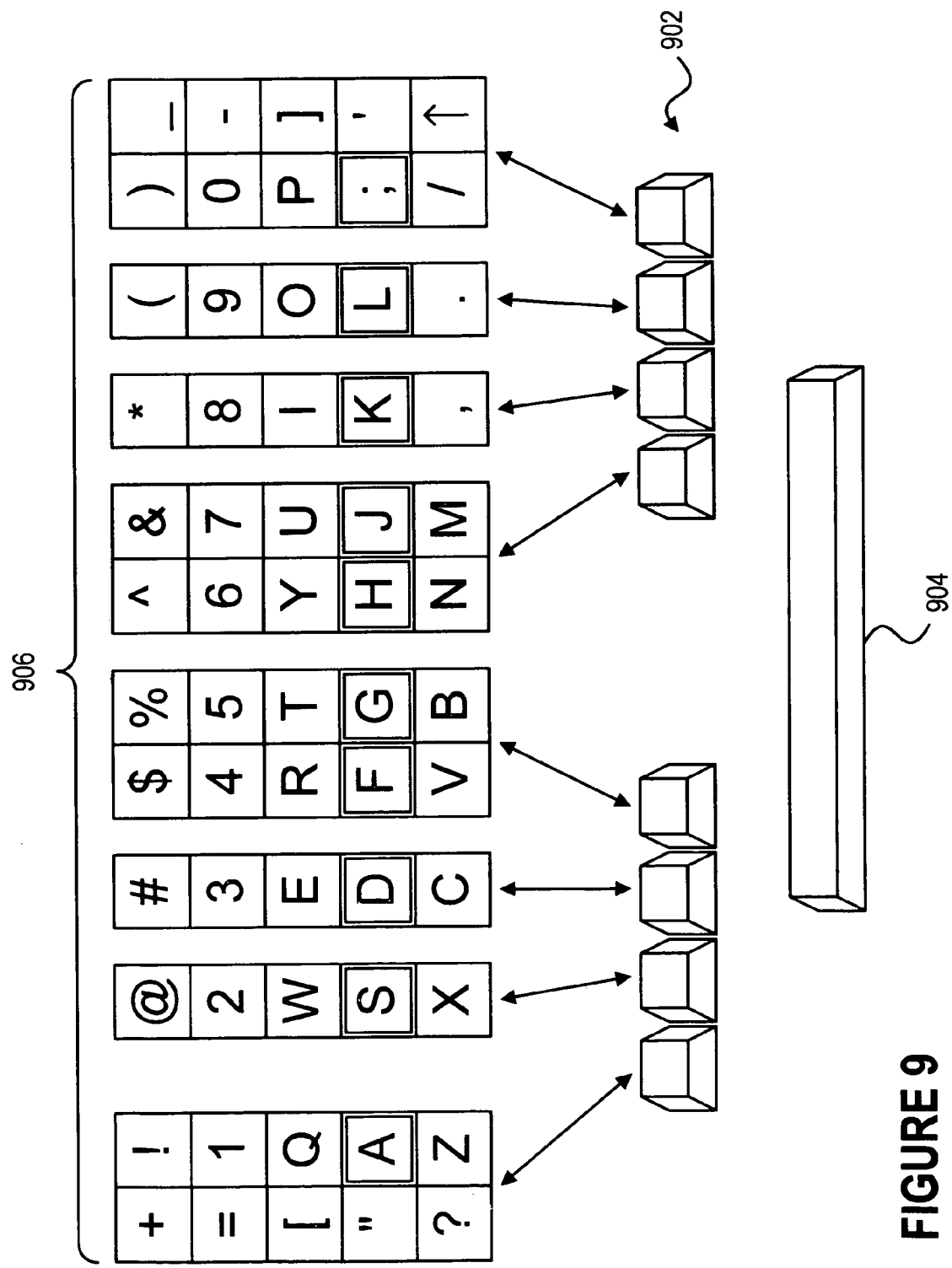
FIG. 9 is a perspective view of a reduced keyboard and associated character maps showing nine (9) keys which can collectively provide the functionality of a standard QWERTY-style computer keyboard.

FIG. 9 shows a reduced keyboard in which just eight (8) multi-directional keys 902 and one space bar 904 are used to provide the functionality of a standard and ubiquitous QWERTY keyboard used in practically every computer ever made as well as other appliances such as typewriters, labelers, and two-way pagers, for example. Keys 902 are associated with character maps 906 as shown and processed as described above with respect to logic flow diagram 600 (FIG. 6) to allow a user using only eight (8) keys to enter any letter of the Roman alphabet, any numeral from zero to nine, and numerous typographical symbols. It should be noted that the pressing and rocking of keys 902 to select characters shown in character maps 906 closely mimics the motion used by a typist using a standard and conventional QWERTY keyboard.

Figure 10:
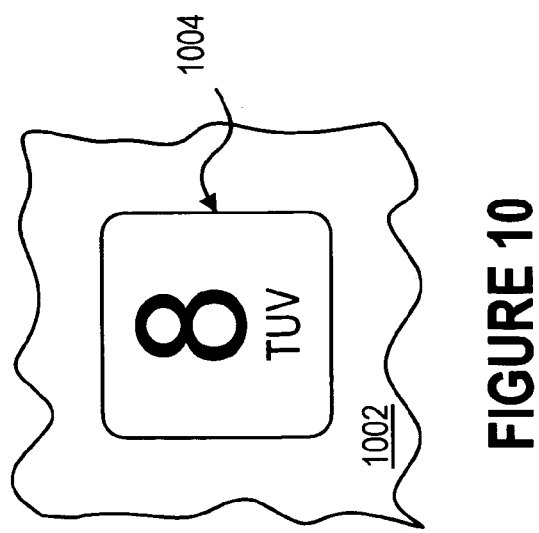
FIG. 10 is a partial screen view of a virtual multidirectional key implemented in a touch-sensitive screen in accordance with the present invention.

User data input through multidirectional keys can also be used in simulated keypads, e.g., on a touch-sensitive screen. FIG. 10 shows a touch-sensitive screen 1002 in which a simulated key 1004 is implemented. The user can use a technique similar to that described above with respect to key 202 (FIG. 2) and state diagram 700 (FIG. 7) in unambiguously specifying any of a number of characters associated with simulated key 1004. In particular, the user can touch simulated key 1004 with a finger or stylus and then slide the finger or stylus across touch-sensitive screen 1002 in a gesture analogous to the rocking of key 202 (FIG. 2) described above. In fact, selection of a character of character map 500 (FIG. 5) can be facilitated by displaying character map 500 over simulated key 1004 (FIG. 10) in touch-sensitive screen 1002 in response to detection of touching of simulated key 1004. As the user slides a finger or stylus over character map 500 (FIG. 5) displayed in touch-sensitive screen 1002, the currently assumed character selected in step 608 (FIG. 6) is highlighted in touch-sensitive screen 1002. The character is detected as selected when the user lifts the finger or stylus from touch-sensitive screen 1002.

Figure 12:
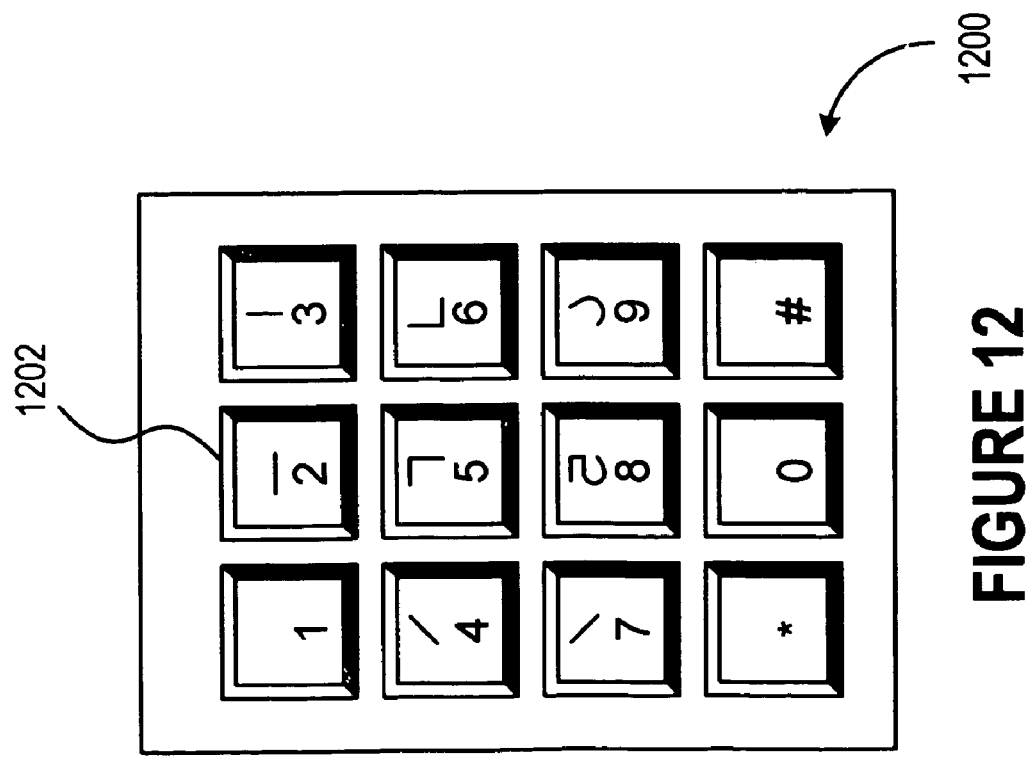
FIG. 12 is a plan view of a numeric keypad of multidirectional keys representing groups of strokes in accordance with the present invention.

While multidirectional keys described above represent groups of written characters, it should be appreciated that multidirectional keys can similarly represent groups of strokes used to construct a written symbol. The O'Dell Patent describes a system whereby a user specifies a written character (e.g., of the Chinese language) by pressing keys representing one or more strokes by which the character is typically manually written. A numeric keypad 1200 (FIG. 12) includes multidirectional keys such as those described above wherein each multidirectional key represents a group of strokes used to write characters of the Chinese language. Key 1202 represents generally straight and generally horizontal strokes.

Figure 13:
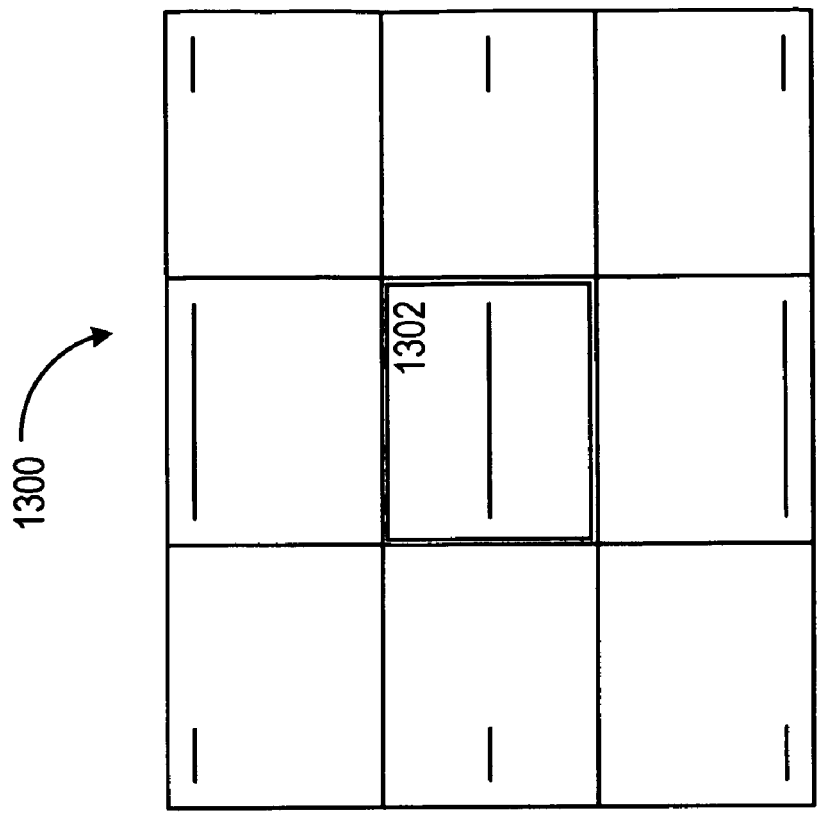
FIG. 13 is a character map illustrating spatial relationships between individual strokes of a stroke group associated with a single key of the numeric keypad of FIG. 12 in accordance with the present invention.

Character map 1300 (FIG. 13) shows a number of strokes represented by key 1202. Pressing key 1202 initially specifies a long horizontal stroke 1302 at a middle height. Chinese characters are written so as to be generally equal in size. Accordingly, relative position of a stroke within the fixed size character has significance.

To position the horizontal stroke higher in the character, the user rocks key 1202 (FIG. 12) in the up direction. To position the horizontal stroke lower in the character, the user rocks key 1202 in the down direction. To shorten the horizontal stroke and move it to the right, the user rocks key 1202 in the right direction. To shorten the horizontal stroke and move it to the left, the user rocks key 1202 in the left direction. Thus, to specify a short horizontal stroke which is horizontally aligned to the left and which is vertically positioned toward the bottom of a character, the user presses key 1202, rocks key 1202 to the left, and rocks key 1202 in the down direction. It is appreciated that the equivalent result is achieved if the user rocks key 1202 downward first and subsequently to the left.

It should be noted that the rocking of key 1202 is particularly intuitive since the spatial orientation of the specified stroke corresponds to the direction in which key 1202 is rocked. For example, rocking key 1202 upward causes a corresponding upward movement in the specified stroke. Accordingly, use of key 1202 in accordance with the present invention is particularly intuitive to a user.

It should be appreciated that use of multidirectional keys in the manner described above is applicable to a wide variety of devices and appliances. Just a few are listed here to facilitate appreciation of the wide applicability of the system described herein. For example, Personal Digital Assistants (PDAs) and compact personal information managers (PIMs) can utilize text entry in the manner described here to enter contact information and generally any type of data. Entertainment equipment such as DVD players, VCRs, etc. can use text entry in the manner described above for on-screen programming or in video games to enter names of high scoring players. Video cameras with little more than a remote control with a numeric keypad of multidirectional keys can be used to enter text for textual overlays over recorded video. In addition, a full-size, standard 105-key keyboard can use multidirectional keys to map large numbers of symbols, e.g., of written Chinese, Japanese, or Korean languages, to various keys to enable native-language word processing or any data entry in a full-sized, fully-functional computer system.

The above description is illustrative only and is not limiting. Instead, the present invention is defined solely by the claims which follow and their full range of equivalents.

What is claimed is:

1. A machine comprising:
   a processor;
   a memory operatively coupled to the processor; and
   a data entry module (i) which executes in the processor from the memory and (ii) which, when executed by the processor, causes the machine to disambiguate among two or more symbols associated with a key of the machine by:
      detecting a first type of actuation of the key;
      in response to the detecting of the first type of actuation, displaying a representation of the two or more symbols;
      detecting a second type of actuation of the key; and
      selecting a selected one of the two or more symbols in accordance with the second type of actuation.

2. The machine readable medium of claim 1 wherein the first type of actuation includes pressing the key.

3. The machine readable medium of claim 2 wherein the second type of actuation includes rocking the key.

4. The machine readable medium of claim 1 wherein the key is a virtual key realized in a touch-sensitive device; and further wherein the first type of actuation includes touching the virtual key within the touch-sensitive device.

5. The machine readable medium of claim 4 wherein the touch-sensitive device is a touch-sensitive screen.

6. The machine readable medium of claim 4 wherein the second type of actuation is a sliding along the touch-sensitive device.

7. The machine readable medium of claim 1 wherein selecting comprises:
   navigating through the representation according to the second type of actuation of the key.

8. A method for disambiguating among two or more symbols associated with a key, the method comprising:
   detecting a first type of actuation of the key;
   in response to the detecting of the first type of actuation, displaying a representation of the two or more symbols;
   detecting a second type of actuation of the key; and selecting a selected one of the two or more symbols in accordance with the second type of actuation.

9. The method of claim 8 wherein selecting comprises:
navigating through the representation according to the second type of actuation of the key.

10. The method of claim 8 wherein the first type of actuation includes pressing the key.

11. The method of claim 10 wherein the second type of actuation includes rocking the key.

12. The method of claim 8 wherein the key is a virtual key realized in a touch-sensitive device; and
further wherein the first type of actuation includes touching the virtual key within the touch-sensitive device.

13. The method of claim 12 wherein the touch-sensitive device is a touch-sensitive screen.

14. The method of claim 12 wherein the second type of actuation is a sliding along the touch-sensitive device.

15. A machine readable medium useful in association with a machine which includes a processor and a memory, the machine readable medium including instructions which are configured to cause the machine to disambiguate among two or more symbols associated with a key of the machine by:
detecting a first type of actuation of the key;
in response to the detecting of the first type of actuation, displaying a representation of the two or more symbols;
detecting a second type of actuation of the key; and
selecting a selected one of the two or more symbols in accordance with the second type of actuation.

16. The machine readable medium of claim 15 wherein selecting comprises:
navigating through the representation according to the second type of actuation of the key.

17. The machine readable medium of claim 15 wherein the first type of actuation includes pressing the key.

18. The machine readable medium of claim 17 wherein the second type of actuation includes rocking the key.

19. The machine readable medium of claim 15 wherein the key is a virtual key realized in a touch-sensitive device; and
further wherein the first type of actuation includes touching the virtual key within the touch-sensitive device.

20. The machine readable medium of claim 19 wherein the touch-sensitive device is a touch-sensitive screen.

21. The machine readable medium of claim 19 wherein the second type of actuation is a sliding along the touch-sensitive device.

* * * * *